(12) United States Patent
Lim et al.

(10) Patent No.: US 9,157,387 B2
(45) Date of Patent: Oct. 13, 2015

(54) FUEL COMBUSTION ENHANCEMENT APPARATUS OF INTERNAL COMBUSTION ENGINE

(71) Applicant: Yunsik Lim, Busan (KR)

(72) Inventors: Yunsik Lim, Busan (KR); Jiwon Im, Busan (KR); Tetsuya Miyazaki, Fukuoka (JP)

(*) Notice: Subject to any disclaimer, the term of this patent is extended or adjusted under 35 U.S.C. 154(b) by 0 days.

(21) Appl. No.: 14/339,744

(22) Filed: Jul. 24, 2014

(65) Prior Publication Data

US 2015/0013641 A1 Jan. 15, 2015

Related U.S. Application Data

(63) Continuation of application No. PCT/KR2013/010756, filed on Nov. 26, 2013.

(30) Foreign Application Priority Data

Jul. 5, 2013 (KR) ........................ 10-2013-0078936

(51) Int. Cl.
   *F02M 27/04* (2006.01)
   *F02D 29/02* (2006.01)

(52) U.S. Cl.
   CPC .............. *F02D 29/02* (2013.01); *F02M 27/04* (2013.01); *F02M 27/042* (2013.01); *F02D 2700/07* (2013.01); *F02M 2027/047* (2013.01); *Y02T 10/126* (2013.01)

(58) Field of Classification Search
   CPC  F02M 27/04; F02M 27/042; F02M 2027/047

USPC .................................................. 123/536, 537
See application file for complete search history.

(56) References Cited

U.S. PATENT DOCUMENTS

| | | | | |
|---|---|---|---|---|
| 4,150,647 A * | 4/1979 | Suzuki et al. | ................. | 123/438 |
| 4,966,121 A * | 10/1990 | Koga | ............................ | 123/536 |
| 5,236,670 A * | 8/1993 | Iwata | ...................... | 422/186.04 |
| 5,329,910 A * | 7/1994 | Tanaka | ......................... | 123/536 |
| 5,487,874 A * | 1/1996 | Gibboney, Jr. | ........... | 422/186.03 |
| 5,507,267 A * | 4/1996 | Stuer | ........................... | 123/537 |
| 5,517,975 A * | 5/1996 | Iwata | .......................... | 123/538 |
| 8,640,677 B2 * | 2/2014 | Gonzales et al. | ............. | 123/537 |
| 2002/0152674 A1* | 10/2002 | Prevost | .......................... | 44/639 |
| 2003/0140903 A1* | 7/2003 | Smoot | .......................... | 123/538 |

* cited by examiner

*Primary Examiner* — Erick Solis
(74) *Attorney, Agent, or Firm* — Park & Associates IP Law, P.C.

(57) ABSTRACT

A fuel combustion enhancement apparatus of an internal combustion engine, which is capable of greatly reducing fuel and improving combustion efficiency and torque and reducing exhaust gas, includes a power source terminal, a conductor plate 10 for gas activation, an amplifier 30, and a gas activation enhancement device 20 which includes a frequency resonance coil power source 22, a local oscillation power source, a detection circuit 23, a power amplification circuit 24, a power amplification IC 27, and an amplifier power source 28 connected between the power source terminal and the conductor plate. The conductor plate 10 includes a coil unit 12, and copper plates 14 are electrically connected between both ends of the coil unit 12, and auxiliary plates 16 made of materials having a different standard electrode potential value from materials of the copper plates are disposed at bottoms of the copper plates 14.

4 Claims, 4 Drawing Sheets

FUEL COMBUSTION ENHANCEMENT APPARATUS OF INTERNAL COMBUSTION ENGINE

REFERENCE TO RELATED APPLICATIONS

This is a continuation of pending International Patent Application PCT/KR2013/010756 filed on Nov. 26, 2013, which designates the United States and claims priority of Korean Patent Application No. 10-2013-0078936 filed on Jul. 5, 2013, the entire contents of which are incorporated herein by reference.

FIELD OF THE INVENTION

The present invention relates to the fuel combustion enhancement apparatus of an internal combustion engine, which is capable of improving combustion efficiency of the internal combustion engine by significantly reducing fuel through the improvement of combustion efficiency, the improvement of torque, and a reduction of exhaust gas and of protecting a battery attached to the internal combustion engine in heating devices and the internal combustion engines of vehicles or vessels using petroleums or gas.

BACKGROUND OF THE INVENTION

In general, the internal combustion engine of a vehicle or a vessel using carbonate hydrogen or gas is driven by a combustion reaction that is generated due to fuel, purified oxygen, and air, such as nitrogen. It has been known that efficiency of the internal combustion engine is determined by how much is a reaction of fuel and air used for a unit time generated. Accordingly, a method of reducing fuel has an object of improving combustion efficiency close to perfect combustion, improving torque, and reducing exhaust gas. To this end, catalyst or a magnet is mounted on a fuel pipe, or means for activating air for combustion is used.

In particular, regarding the means for activating air, as disclosed in Korean Patent Application Registration No. 10-0783825 and Korean Patent Application Publication No. 10-2010-0093936, the ionization of air that is introduced into an internal combustion engine is accelerated by the vibration of a plurality of units, each including a first copper plate and a second copper plate disposed on both ends of a coil unit, within an amplifier connected to the units using a micro current, thereby improving combustion efficiency and removing carbon or scales attached to a fuel engine and a pipe. Accordingly, fuel is reduced because a heat cycle and the transfer of heat become smooth.

In this conventional combustion efficiency improvement method, air is forcedly injected using a tool or combustion efficiency is improved using fuel additives. Accordingly, there is a problem in that carbon or scales are removed using a physical method in order to facilitate the transfer of heat.

SUMMARY OF THE INVENTION

Accordingly, the present invention has been made keeping in mind the above problems occurring in the prior art, and an object of the present invention is to provide a gas activation enhancement device capable of having a simple structure and greatly reducing fuel used in an internal combustion engine by improving combustion efficiency and torque and reducing exhaust gas.

The fuel combustion enhancement apparatus of an internal combustion engine according to the present invention includes a power source terminal, a conductor plate 10 for gas activation, and an amplifier 30. A gas activation enhancement device 20 includes a frequency resonance coil power source 22, a local oscillation power source, a detection circuit 23, a power amplification circuit 24, a power amplification IC 27, and an amplifier power source 28 is connected between the power source terminal and the conductor plate. The conductor plate 10 includes a coil unit 12, copper plates 14 are electrically connected between both ends of the coil unit 12, and auxiliary plates 16 made of materials having a different standard electrode potential value from materials of the copper plates are disposed at bottoms of the copper plates 14.

Furthermore, the internal parts of the copper plates 14 connected to the coil unit 12 on both sides of the coil unit 12 are upward bent, and the copper plates 14 are spaced apart at a specific interval with the coil unit 12 interposed between the copper plates 14 at a bottom of the conductor plate 10.

Furthermore, pins 18 and 19 that stand vertically from the copper plates are provided on top of the copper plates 14.

Figure 1:
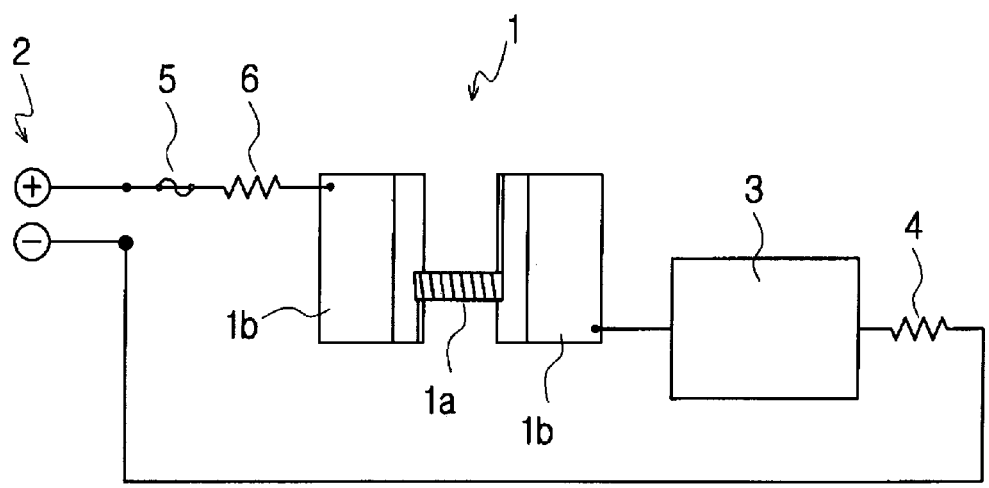
FIG. 1 is a diagram illustrating a conventional fuel combustion enhancement apparatus of an internal combustion engine.

Description of reference numerals of principal elements in the drawings

| | |
|---|---|
| 1, 10, 10a: conductor plate | 1a, 12: the coil unit |
| 1b: conductor unit | 14: copper plate |
| 16: auxiliary plates | 3, 30, 30a: amplifier |
| 20: gas activation enhancement device | |
| 22: frequency resonance coil power source | |
| 23: local oscillation power source and the detection circuit | |
| 24: the power amplification circuit | |

DETAILED DESCRIPTION OF THE INVENTION

The fuel combustion enhancement apparatus of an internal combustion engine according to an embodiment of the present invention is equipped with a gas activation enhancement device 20, including a frequency resonance coil power source 22, a detection circuit 23, a local oscillation power source 25, a power amplification circuit 24, a power amplification IC 27, and an amplifier power source 28, between a power source terminal and a conductor plate in the fuel combustion enhancement apparatus of the internal combustion engine including a power source terminal, a conductor plate, and an amplifier.

The fuel combustion enhancement apparatus is described in more detail below.

In general, in a combustion efficiency improvement apparatus disposed in an air inflow path for combustion in an internal combustion engine using petroleums or gas as fuel, as illustrated in FIG. 1, a power source unit 2 configured to supply a power source, a conductor plate 1 configured to have copper plates 1b connected to both sides of a coil unit 1a, an amplifier 3 connected to the conductor plate, specific resistors 4 and 6, and a fuse 5 are connected to a power source.

The fuel combustion enhancement apparatus of the internal combustion engine according to an embodiment of the present invention is configured to include a gas activation enhancement device for gas activation in the aforementioned conventional structure in order to reduce mileage by raising the combustion of fuel.

Figure 2:
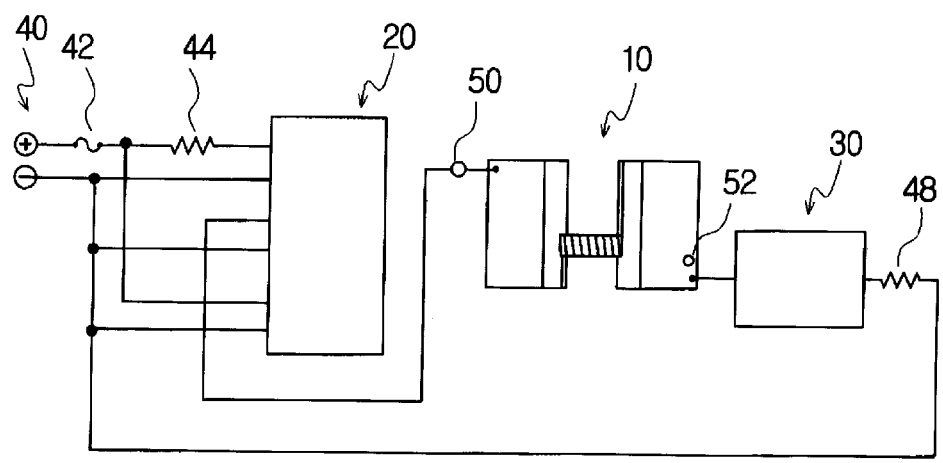
FIG. 2 is a diagram illustrating a fuel combustion enhancement apparatus of an internal combustion engine according to an embodiment of the present invention.

FIG. 2 illustrates the state in which a common conductor plate 10 for gas activation as described above and the gas activation enhancement device 20 according to an embodiment of the present invention are coupled In this case, the gas activation enhancement device 20 is electrically connected between a power source terminal 40 and the conductor plate 10. An amplifier 30, a specific resistor 44, a specific variable resistor 48, and a fuse 42 are included.

Figure 5:
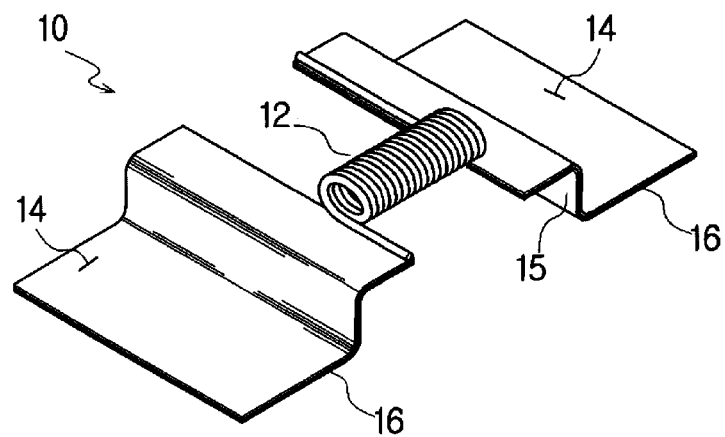
FIG. 5 is a diagram illustrating the conductor plate of the fuel combustion enhancement apparatus of the internal combustion engine according to an embodiment of the present invention.

As illustrated in FIG. 5, the conductor plate 10 includes a coil unit 12 made of copper, titanium, platinum, gold, or silver. Copper plates 14 are electrically connected to both ends of the coil unit 12. Auxiliary plates 16 made of materials having a different standard electrode potential value from the materials of the copper plates 14 are attached to the bottoms of the copper plates 14.

The auxiliary plate 16 may be made of aluminum different form the materials of the copper plate 14 in order to prevent a loss of the vibration of the copper plate 14.

Furthermore, light generation means configured to induce electrons to be generated from a coil and a conductor unit may be included in the conductor unit 10 using a common method. The light generation means may include a plurality of LEDs 50 and 52 in order to increase kinetic energy of electrons emitted from the coil and the conductor unit and the amount of the emitted electrons. In this case, the LED 52 of the light generation means needs to include a violet LED for a photoelectric effect. A red LED, that is, an inspection lamp, may be used as the LED 50. The variable resistor 48 for controlling the vibration of the LED 50 and a wire connection state is included.

As illustrated in FIG. 5, the internal parts of the copper plates 14 connected to the coil unit 12 on both sides of the coil unit 12 are upward bent. Thus, the copper plates 14 are spaced apart at a specific interval with the coil unit 12 interposed between the copper plates 14 at the bottom of the conductor plate 10. Accordingly, the activation of gas can be increased because the ventilation of air becomes smooth.

Figure 6:
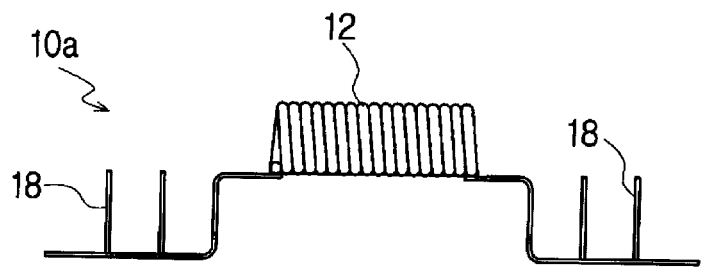
FIGS. 6 and 7 are diagrams illustrating another embodiment of the conductor plate in the fuel combustion enhancement apparatus of the internal combustion engine according to an embodiment of the present invention.
Figure 7:
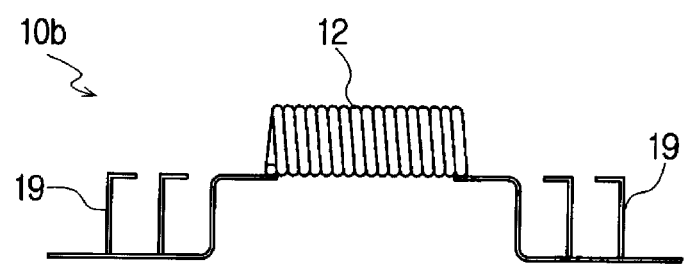

To this end, specific pins 18 and 19 configured to stand vertically from a first conductor unit are provided on top of the copper plates 14, as illustrated in FIGS. 6 and 7.

In such a conductor plate 10 for gas activation, a potential difference is present between the copper plates 14 and the auxiliary plates 16 having different standard electrode potential values. When an electric current is applied to the copper plates 14 through a wire connected to the power source supply unit, the materials of the copper plates are ionized, so electrons are emitted from the copper plates 14. Furthermore, when light generated by the light generation means acts on the coil unit 12 and the copper plates 14, a photoelectric effect is generated by the conductor plate 10.

The electrons emitted through such a process collide against air, thus facilitating the ionization of molecules, such as oxygen and nitrogen in the air. Accordingly, vibration air whose ionization has been accelerated increases combustion reactivity between carbonate hydrogen and gas fuel, thereby increasing efficiency of the internal combustion engine.

The conductor plate 10 of the fuel combustion enhancement apparatus of the internal combustion engine according to an embodiment of the present invention includes the pins 18 and 19 configured to vertically stand on top of the copper plates 14 in order to maximize resonance when external air passes through the copper plates 14.

Figure 4:
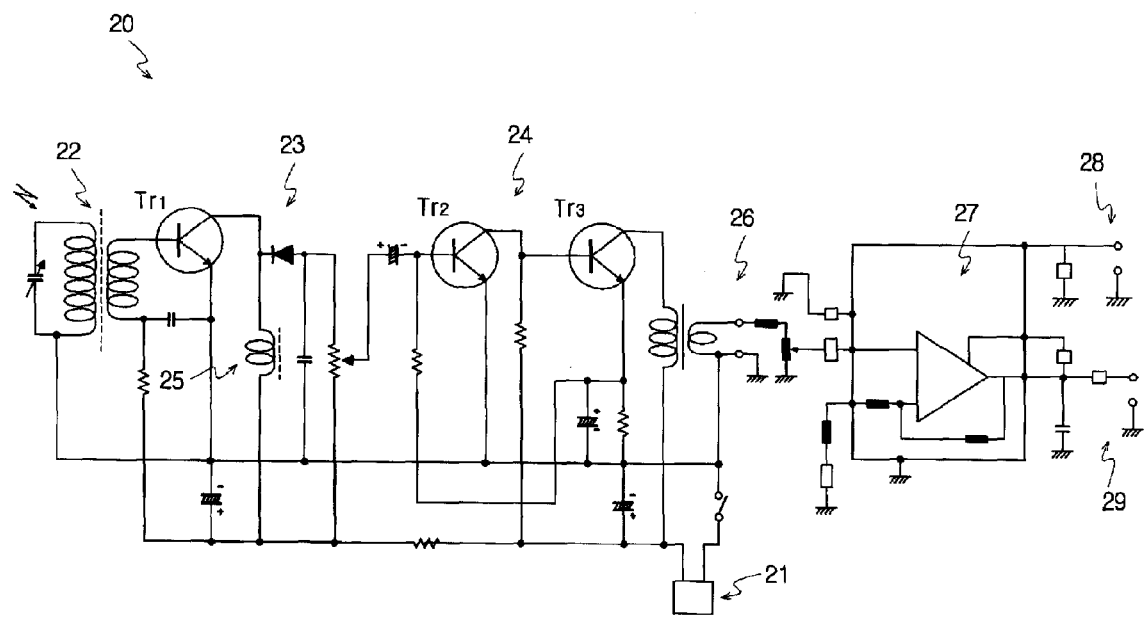
FIG. 4 is a circuit diagram illustrating a gas activation enhancement device in the fuel combustion enhancement apparatus of the internal combustion engine according to an embodiment of the present invention.

Furthermore, FIG. 4 illustrates the gas activation enhancement device 20 connected to the conductor plate 10.

When the gas activation enhancement device 20 of FIG. 4 is connected to the conductor plate 10, the amplitude of the conductor plate 10 is increases 20 times or higher.

Furthermore, the conductor plate has higher energy compared to a case where the gas activation enhancement device is not connected to the conductor plate 10 because resonance is increased by the increased amplitude of electrons.

In order to produce increased vibration air, the gas activation enhancement device 20 is configured to receive an AM frequency having severe vibration and amplify the received AM frequency. The gas activation enhancement device and a current circuit are mixed to vibrate the gas activation conductor plate 10. Accordingly, the combustion of fuel can be increased and mileage can be significantly improved because the electrons of atoms within the air are resonated.

To this end, the gas activation enhancement device 20 includes the power source unit 21 configured to supply DC power, the frequency resonance coil power source 22, the detection circuit 23, and the local oscillation power source 25. The power amplification circuit 24 is connected to the power amplification IC 27 through a reception circuit input/output unit 26.

Furthermore, the power amplification IC 27 includes the amplifier power source 28 and an output unit 29. The output unit 29 is connected to the conductor plates 10 for gas activation, as illustrated in FIG. 2 or FIG. 3.

Figure 3:
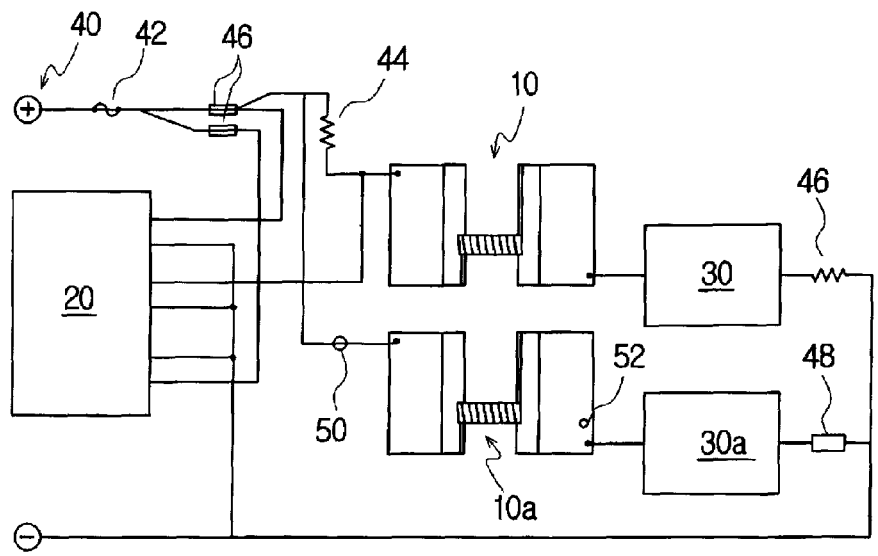
FIG. 3 is a diagram illustrating the state in which the fuel combustion enhancement apparatus of the internal combustion engine according to an embodiment of the present invention is differently implemented.

FIG. 3 illustrates the state in which conductor plates 10 and 10a and amplifiers 30 and 30a are coupled in two stages in parallel in order to increase gas activation in a single gas activation enhancement device 20. In this case, gas activation can be further increased because the conductor plates and the amplifiers are coupled in multiple stages.

If the gas activation enhancement device 20 according to an embodiment of the present invention is connected to the common conductor plate 10 as described above, the conductor plate has higher energy because resonance is increased by the increased amplitude of electrons and electrons emitted in such a process collide against air, thereby accelerating the ionization of molecules, such as oxygen and nitrogen within the air. Vibration air whose ionization has been accelerated increases combustion reactivity between carbonate hydrogen and gas fuel. Accordingly, there are advantages in that fumes can be reduced because perfect combustion is achieved, sulfuric acid within a battery can be prevented from being easily hardened, the lifespan of the battery can be extended, and efficiency of an internal combustion engine can be greatly improved.

What is claimed is:

1. A fuel combustion enhancement apparatus of an internal combustion engine comprising a power source terminal, a conductor plate (10) for gas activation, and an amplifier (30), the fuel combustion enhancement apparatus comprising:

a gas activation enhancement device (20) comprising a frequency resonance coil power source (22), a local oscillation power source, a detection circuit (23), a power amplification circuit (24), a power amplification IC (27), and an amplifier power source (28) is connected between the power source terminal and the conductor plate.

2. The fuel combustion enhancement apparatus of claim 1, wherein:

the conductor plate (10) comprises a coil unit (12), copper plates (14) are electrically connected between both ends of the coil unit (12), and auxiliary plates (16) made of materials having a different standard electrode potential value from materials of the copper plates are disposed at bottoms of the copper plates (14).

3. The fuel combustion enhancement apparatus of claim 2, wherein:

internal parts of the copper plates (14) connected to the coil unit (12) on both sides of the coil unit (12) are upward bent, and the copper plates (14) are spaced apart at a specific interval with the coil unit (12) interposed between the copper plates (14) at a bottom of the conductor plate (10).

4. The fuel combustion enhancement apparatus of claim 2, wherein pins (18) and (19) that stand vertically from the copper plates are provided on top of the copper plates (14).

\* \* \* \* \*